United States Patent [19]

Robichaud et al.

[11] Patent Number: 5,638,629

[45] Date of Patent: Jun. 17, 1997

[54] POCKET SIZE FISH STRIKE INDICATING FIXTURE

[76] Inventors: Paul J. Robichaud, 235 Whalom Rd., Lunenburg, Mass. 01462; Peter J. Robichaud, 265 Day St., Leominister, Mass. 01453

[21] Appl. No.: 392,112

[22] Filed: Feb. 22, 1995

[51] Int. Cl.⁶ ............................................. A01K 97/12
[52] U.S. Cl. ........................................................ 43/17
[58] Field of Search ..................................... 43/17, 25

[56] References Cited

U.S. PATENT DOCUMENTS

| | | |
|---|---|---|
| 3,037,314 | 6/1962 | Hardy . |
| 3,199,241 | 8/1965 | Mauritz .................... 43/17 |
| 3,221,705 | 12/1965 | Saviskas . |
| 3,280,496 | 10/1966 | London ..................... 43/17 |
| 3,645,028 | 2/1972 | Rayburn .................... 43/17 |
| 3,646,698 | 3/1972 | Zachae ...................... 43/17 |
| 3,656,251 | 4/1972 | Snider et al. ............... 43/17 |
| 3,959,910 | 6/1976 | Montgomery ............... 43/17 |
| 4,038,772 | 8/1977 | Mihály ...................... 43/17 |
| 4,092,795 | 6/1978 | Bryant ....................... 43/17 |
| 4,146,988 | 4/1979 | Bednarczyk . |
| 4,178,712 | 12/1979 | Williams .................... 43/17 |
| 4,519,158 | 5/1985 | Kirk .......................... 43/17 |
| 4,520,586 | 6/1985 | Moisan ...................... 43/17 |
| 4,586,284 | 5/1986 | Westwood .................. 43/17 |
| 4,679,345 | 7/1987 | Hall .......................... 43/17 |
| 5,129,174 | 7/1992 | Wilson ...................... 43/17 |
| 5,185,949 | 2/1993 | Patterson ................... 43/17 |
| 5,269,088 | 12/1993 | Slaback, Jr. et al. ........ 43/17 |

*Primary Examiner*—Kurt Rowan
*Attorney, Agent, or Firm*—Kenneth F. Kozik

[57] ABSTRACT

A signal fixture for facilitating indication of a striking fish to a fisherman using a baited line and fishing pole. A channel body is provided which can easily snap on and off of the fishing pole. A signal indicator is housed within the channel and held within the channel by a trigger device. The trigger device is adjustably attached to the body and provides attachment to the fishing line and to the signal indicator. When a fish strikes the line rotates the trigger device to allow the signal device to extend perpendicularly from the channel body and thus indicate a striking fish.

11 Claims, 4 Drawing Sheets

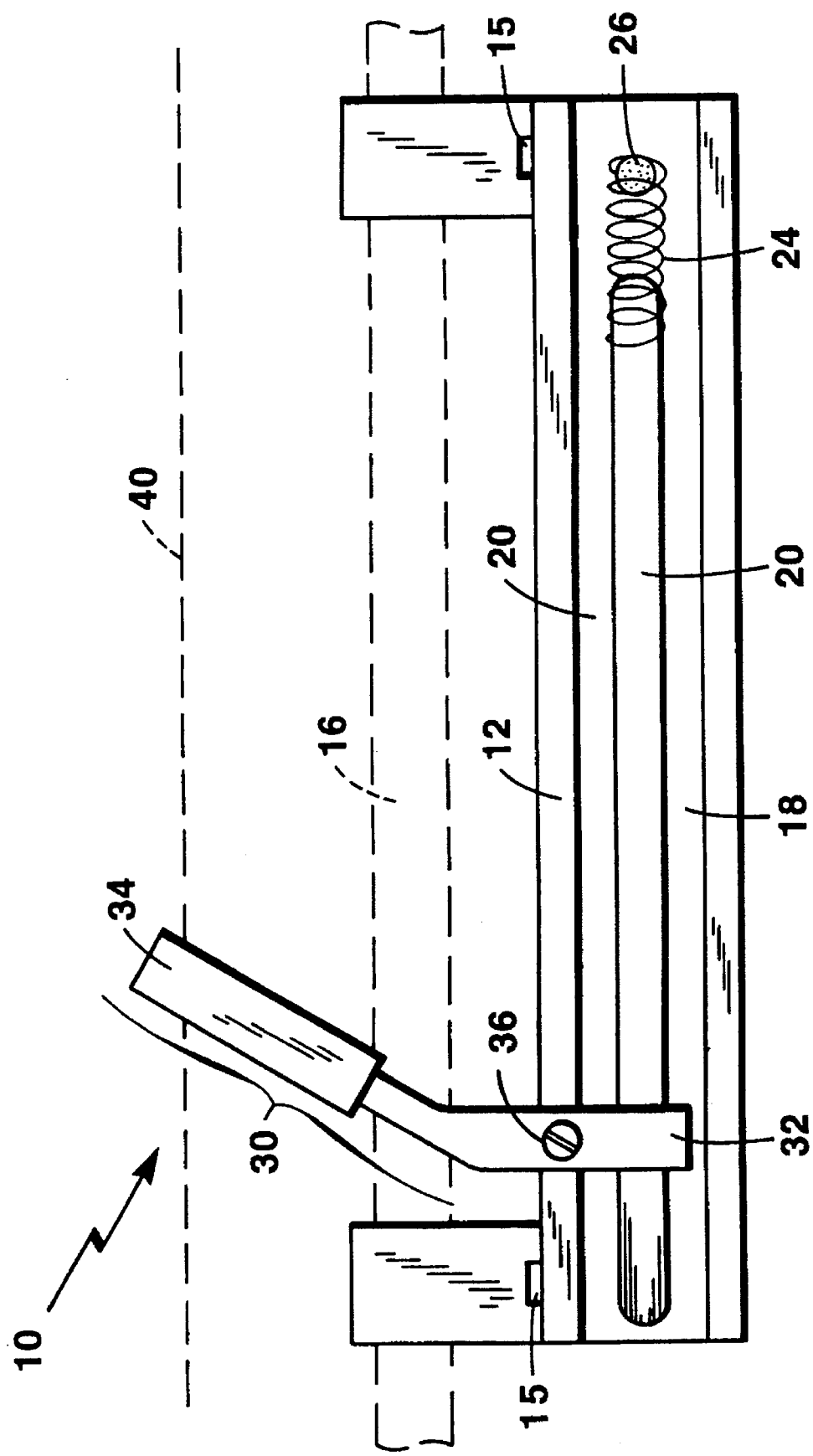

POCKET SIZE FISH STRIKE INDICATING FIXTURE

BACKGROUND OF THE INVENTION

The present invention relates the field of sport fishing, and more particularly to the field of fish strike indicating fixtures.

As is well known in the art, the object of fishing is to catch a fish. Traditionally, an angler places some bait onto a hook, casts out the line with the aid of a fishing reel and fishing rod, and when the angler senses a fish on the line, the angler reels it in. Over the years, various fishing devices have been produced in order to aid the angler in detecting when a fish is on the line.

Several primitive methods of detecting the strike of a fish are well known in the art. One such method is to attach a coffee cup to the line. When the cup moves, it signals a striking fish. Another such method is to use a bobber or small stick attached to the fishing line. Again, when a fish strikes the bait on the line, the bobber or small stick move.

Another such method is to attach a variety of bells to the fishing line. With such an arrangement, the bells are likely to frighten away other fish in the area.

Over time, persons skilled in the art sought alternate ways to indicate a striking fish to the angler.

Several devices have been used in the past. One such device is to use a box structure that combines a fishing rod holder adapted with a flagging device. With such arrangement, an angler is required to carry the large box structure to the bank of the water, and make numerous adjustments for its use. Such arrangement is also costly and almost impossible for the angler to pack into his tackle box.

Another approach is to use a cradle type device to hold the fishing pole. With such an arrangement, when a fish is hooked, the rod causes the cradle to move downward, actuating an electric signaling device.

Still another approach is to attach to the fishing line a tubular housing containing a battery, switch, and lamp. With such an arrangement, movement of the fishing line causes the switch to power the light, thus indicating a striking fish. With such an arrangement, the fisherman is required to carry spare batteries and bulbs. In addition, the angler may need to make spot repairs in the wilderness.

A fish signaling fixture is needed which is small, lightweight, efficient, and inexpensive.

SUMMARY OF THE INVENTION

In accordance with the present invention, a fixture which provides a signal to a fisherman when a fish strikes a baited fishing line attached to a fishing pole includes a generally rectangular base, the base having an attachment means for retainingly holding the fishing pole, the base having a channel running longitudinally for housing a signalling means, and an adjustable triggering means. With such an arrangement, a fixture that provides a signal when a fish strikes a baited fishing line is provided. The fixture provides a light weight, inexpensive device to aid fisherman in determining when they have caught a fish.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

FIG. 3 is a cross sectional view of FIG. 1;

DESCRIPTION OF PREFERRED EMBODIMENT

Figure 1:
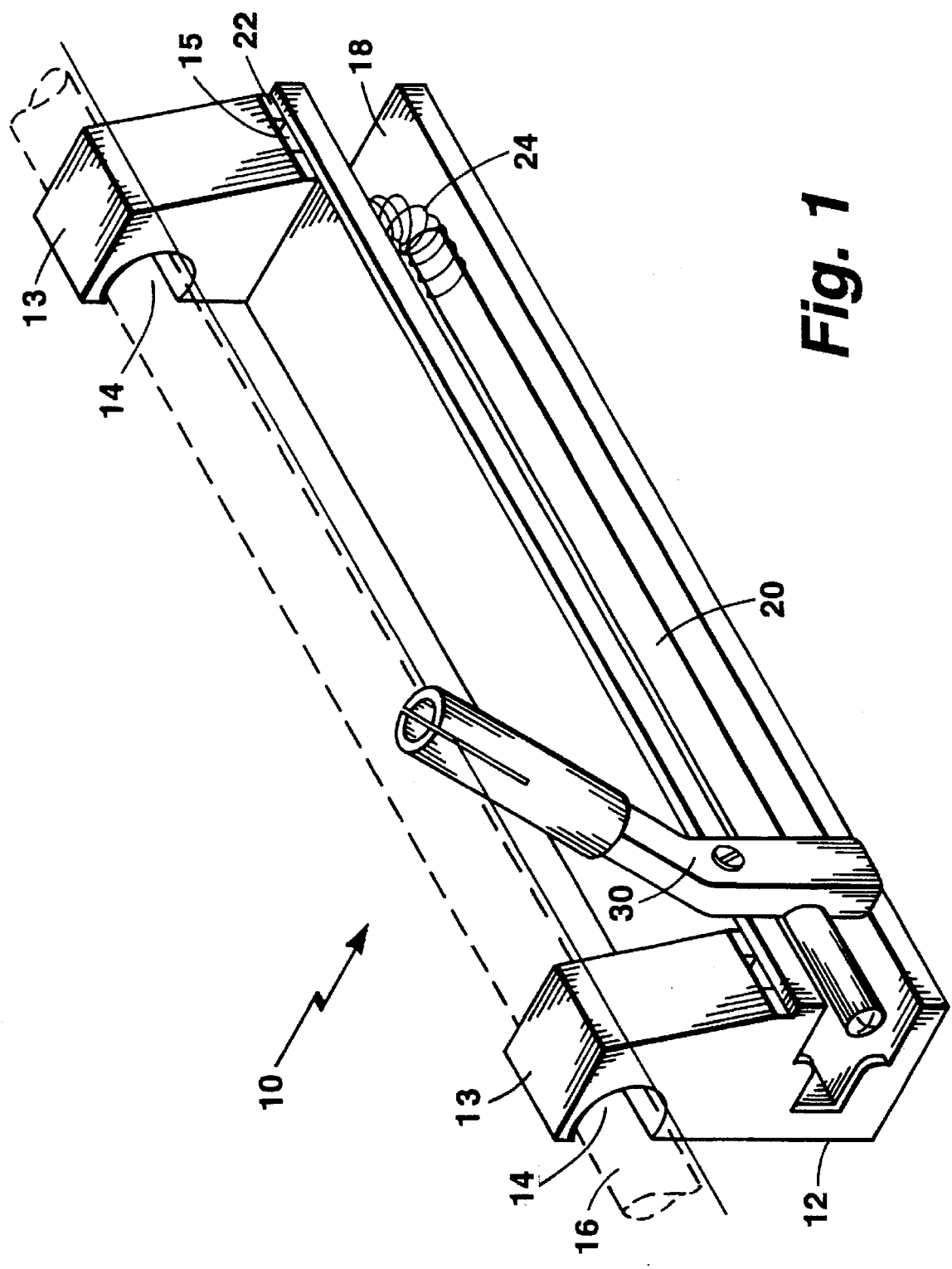
FIG. 1 is an isometric view of a fixture in accordance with the present invention with its signal flag within a channel.
Figure 2:
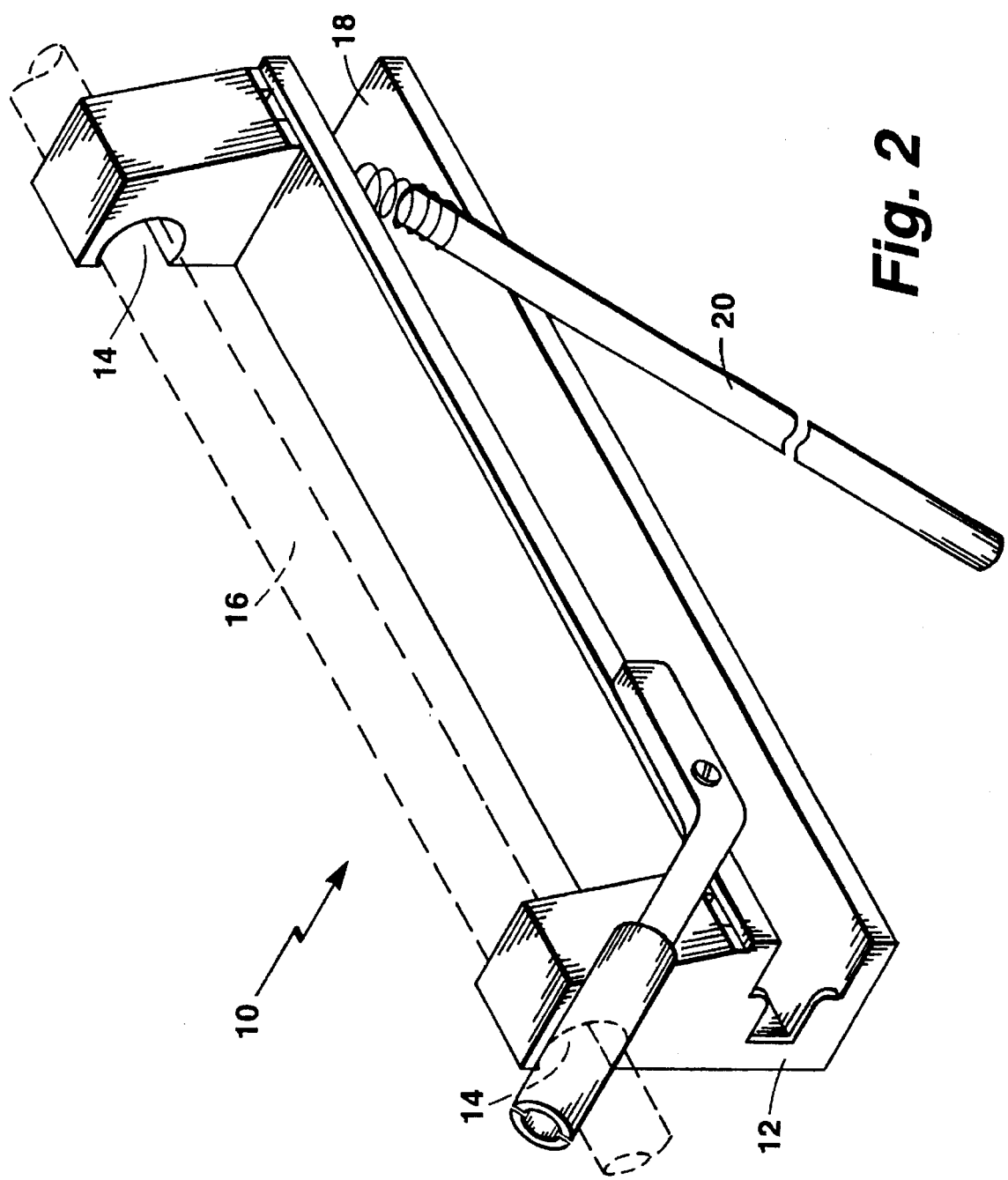
FIG. 2 is an isometric view of the fixture in accordance with the present invention with its signal flag extended perpendicularly from the channel.

Referring now to FIGS. 1, 2, and 3, an indicating fixture 10 for indicating the strike of a fish on a fishing pole 16 is shown to include a base 12. The base 12 can be made of any moldable plastic material that is reasonably rigid. It is preferred to form the base 12 from a black colored polypropylene because of its injection molding and memory characteristics. It is also preferred that the polypropylene contain a ultraviolet (UV) inhibitor to prevent discoloration of the base 12 during the aging process. A preferred example of such a polypropylene material is Amoco PP from Amoco Company. The base 12 contains two snap-on means 14 for attachment of the base 12 to the fishing rod 16. The two snap-on means 14 consist of overlapping recesses formed from two towers 13. Alternatively, the fishing rod 16 may be attached to the fixture 10 by using snap ties (not shown). These snap ties are placed in two snap tie channels 15 and wrapped around the fishing rod 16. The base 12 also contains a channel 18 for seating of a signal rod 20. In FIG. 1, the signal rod 20 is shown seated within the channel 18. In FIG. 2, the signal rod 20 is shown extended out perpendicularly from the base 12.

The signaling rod 20 can be made of any moldable plastic material that is reasonably rigid. It is preferred to form the signal rod 20 from a brightly colored polypropylene. It is also preferred that the polypropylene contain a ultraviolet (UV) inhibitor to prevent discoloration of the signal rod during the aging process. A preferred example of such a polypropylene material is neon orange colored Amoco PP from Amoco Company.

Figure 5:
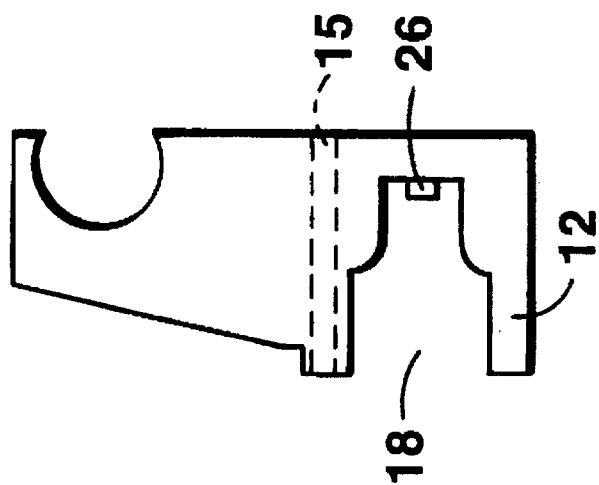
FIG. 5 is a cross sectional view of the small bulge of FIG. 3.

The signal rod 20 is shown connected to the base 12 by an signal rod attachment means 22. The signal rod attachment means 22 is shown to include a spring 24 and a small bulge (26 of FIG. 3 and FIG. 5) projecting from, and part of, the base 12. It is preferred that the spring 24 be rust resistant. It is also preferred that the spring 24 be of the push-fit type. A preferred example of such a spring is a ½ inch by 0.024 stainless steel spring. The signal rod 20 is attached to one end of the spring 24, while the other end of the spring 24 is attached to the small bulge 26 projecting from the base 12. The small bulge 26 is more fully illustrated in FIG. 5.

The base 12 is also shown to include a triggering means 30. The triggering means 30 is shown to include a trigger body 32, a fishing line receptacle 34, and a trigger attachment means 36 for attachment to the fixture 10.

Figure 4:
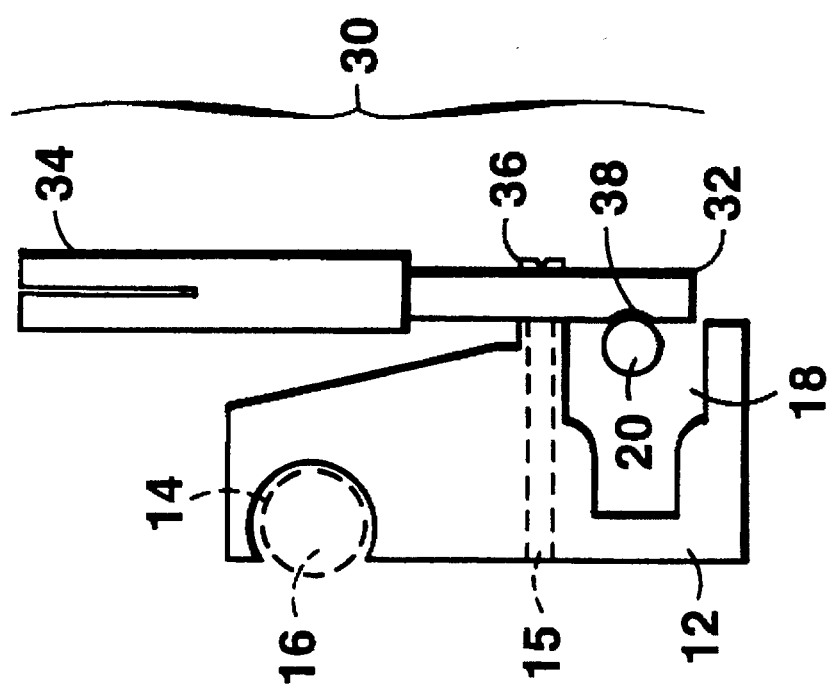
FIG. 4 is a cross sectional view of the triggering device of FIG. 3.

Referring now to FIG. 4, the triggering means 30 is shown in greater detail. As mentioned previously, the trigger body 32 is attached to the base 12 by a trigger attachment means 36. It is preferred that the trigger attachment means 36 be a slotted screw. A preferred example of such a screw is 4-440 pan-head self-threading screw. With such an arrangement, the tension of the trigger body 32 may be adjusted by alternatively loosening or tightening the trigger attachment means 36 with a screwdriver. Alternatively, the trigger attachment means 36 may be an allen head screw or any suitable screw-like means.

The trigger body 32 is also fitted with the fishing line receptacle 34 at its top end. It is preferred that the fishing line receptacle 34 be a hose of a diameter to tightly slip over the top end of the trigger body 32. A preferred example of such a hose is 1 inch by 1/8 inch ID neoprene tubing. Once fitted over the trigger body 32, the fishing line receptacle is slit on the top end for threading the fishing line (30 of FIG. 3). The side of the trigger body 32 facing the channel 18 contains a signal rod recess 38. The signal rod recess 38 provides resting spot when the signal rod 20 is placed in the channel 18, and prevents the signal rod 20 from moving out in a perpendicular fashion. While in the channel 18, the signal rod 20 is under tension due to the triggering means 30. Thus, the signal rod recess 38 prevents the signal rod from extending perpendicularly from the base 12, as shown and described with reference to FIGS. 1 and 3.

Referring again to FIG. 3, the operation of the fixture 10 will now be more fully described. The fixture 10 is snapped on to the fishing rod 16 by using the two snap-on means 14. Once the fishing rod 16 is seated by the two snap-on means 14, the signal rod 20 is pushed into the channel 18 and under, and against, the signal rod recess 38; this prevents the signal rod 20 from being extended perpendicularly away from the base 12. The fishing line 40 is then threaded through the fishing line receptacle 34. When a fish strikes, the movement of the fishing line 40 causes the triggering means 30 to pivotally rotate on the trigger attachment means 36 in a counterclockwise fashion. As the triggering means 30 rotates, the signal rod 20 is freed from the signal rod recess 38 and springs out of the channel 18 to a fully extended position (see FIG. 2) under the tension of the signal rod attachment means 24, thus indicating the striking of the fish.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A fixture which provides a signal to a fisherman when a fish strikes a fishing line attached to a fishing pole comprising:

a generally rectangular base, the base having an attachment means for retainingly holding the fishing pole, the base having a channel running longitudinally for housing a signaling means, the signaling means including a signal rod, a spring, one end of the spring connected to the signal rod, and a protrusion extending from within the channel of the base for connecting the other end of the spring to the base; and an adjustable triggering means comprising:
      a trigger body;
      a screw for connecting the trigger body to the base;
      a fishing line receptacle for attaching the fishing line to the adjustable triggering means, the fishing line receptacle being placed over an upper trigger body; and
      a signal rod recess for seating the signal rod.

2. The fixture according to claim 1 wherein the fishing line receptacle is a slotted neoprene tubing.

3. The fixture according to claim 1 wherein the trigger body has a curved recess facing the channel.

4. The fixture according to claim 1 wherein the base is made from an ultraviolet-stabilized polypropylene.

5. The fixture according to claim 1 wherein the signal rod is made from an ultraviolet-stabilized polypropylene.

6. The fixture according to claim 1 wherein the trigger body is made from ultraviolet-stabilized polypropylene.

7. The fixture according to claim 5 wherein the signal rod is brightly colored.

8. The fixture according to claim 7 wherein the signal rod is neon orange.

9. An arrangement comprising:

a fishing pole;

a fishing line connected to the fishing pole;

a signal fixture snapped on to the fishing pole and providing a receptacle for the fishing line to indicate a striking fish, the signal fixture comprising:
      a body, the body having two towers for receiving the fishing pole;
      a channel extending the length of the body;
      a signal unit connected to the body via a protrusion in the channel extending out from the body and located along the channel, the signal unit including a signal rod and a spring for connecting the signal rod to the protrusion;
      a trigger means attached to the body, the trigger means adapted to connect to the fishing line and capable of rotating to release the signal unit, the trigger means including:
         a trigger body having a lower recess to receive the signal rod;
         a screw for attaching the trigger body to the base; and
         a tubing, the tubing placed over a top end of the trigger body, the tubing slotted to receive the fishing line.

10. The arrangement according to claim 9 wherein the body is made from an ultraviolet-stabilized polypropylene.

11. The arrangement according to claim 9 wherein the signal rod is made from a brightly colored ultraviolet-stabilized polypropylene.

* * * * *